(12) United States Patent
Schaeffler

(10) Patent No.: US 12,110,615 B2
(45) Date of Patent: Oct. 8, 2024

(54) AXIAL BEARING AND POLE DISK FOR AN AXIAL BEARING

(71) Applicant: Maschinenfabrik Rieter AG, Winterthur (CH)

(72) Inventor: Gernot Schaeffler, Waeschenbeuren (DE)

(73) Assignee: Maschinenfabrik Rieter AG, Winterthur (CH)

( * ) Notice: Subject to any disclaimer, the term of this patent is extended or adjusted under 35 U.S.C. 154(b) by 175 days.

(21) Appl. No.: 17/873,350

(22) Filed: Jul. 26, 2022

(65) Prior Publication Data

US 2023/0031746 A1 Feb. 2, 2023

(30) Foreign Application Priority Data

Jul. 28, 2021 (DE) ...................... 10 2021 119 614.0

(51) Int. Cl.
*D01H 4/12* (2006.01)
*F16C 32/04* (2006.01)
*D01H 7/12* (2006.01)

(52) U.S. Cl.
CPC ........... *D01H 4/12* (2013.01); *F16C 32/0419* (2013.01); *D01H 7/12* (2013.01)

(58) Field of Classification Search
CPC .......... D01H 4/12; D01H 7/12; F16C 32/0419
See application file for complete search history.

(56) References Cited

U.S. PATENT DOCUMENTS

| 5,987,871 A | 11/1999 | Winzen |
| 8,072,105 B2 * | 12/2011 | Winzen ................. F16C 39/063 310/90.5 |

FOREIGN PATENT DOCUMENTS

| DE | 197 29 191 A1 | 1/1999 |
| DE | 199 55 829 A1 | 5/2001 |
| DE | 100 50 694 A1 | 4/2002 |
| DE | 10 2008 056 878 A1 | 5/2010 |
| EP | 2 090 681 A2 | 8/2009 |
| JP | H02 113118 A | 4/1990 |

OTHER PUBLICATIONS

Machine Translation of EP 2090681, retrieved Mar. 14, 2024.*
EPO Search Report, Nov. 18, 2022.
German Patent Office Search Report, Apr. 25, 2022.

* cited by examiner

*Primary Examiner* — Shaun R Hurley
(74) *Attorney, Agent, or Firm* — Dority & Manning, P.A.

(57) ABSTRACT

An axial bearing for a spinning rotor of an open-end spinning machine includes a static bearing component having axially polarized permanent magnet rings delimited on both sides by ferromagnetic pole disks arranged in a bearing housing, the static bearing component interacting with a dynamic bearing component formed by ferromagnetic webs arranged on a rotor shaft of the spinning rotor. Each pole disk includes a disk ring, a central opening, a vertical axis, and a horizontal axis. The disk ring includes an area of reduced ferromagnetic material on an inner circumference thereof at the vertical axis as compared to a remaining inner circumferential area of the disk ring.

17 Claims, 5 Drawing Sheets

AXIAL BEARING AND POLE DISK FOR AN AXIAL BEARING

FIELD OF THE INVENTION

The present invention relates to an axial bearing for a spinning rotor of an open-end spinning machine.

BACKGROUND

EP 2090681 A2 describes an axial bearing for a spinning rotor of an open-end spinning machine supported, free of axial thrust, in the bearing interstice of a support disk bearing arrangement. This includes a static bearing component, which has at least two axially polarized permanent magnet rings delimited on both sides by ferromagnetic pole disks and arranged in a bearing housing such that, in the installed state, identical poles are positioned opposite each other. The static bearing component of the axial bearing interacts during operation with a dynamic bearing component, which is formed by ferromagnetic webs arranged on the rotor shaft of the spinning rotor at a distance from the pole disks. Each pole disk has an inner cross section, which has a greater extension in the area of an axis arranged vertically in the installed state of the pole disks than in the area of an axis arranged orthogonally with respect to the vertical axis.

If the rotor shaft of the spinning rotor is located in the axial bearing, the annular gap between the rotor shaft and the pole disk in the inner cross section is larger in the vertical axis than in the horizontal axis. In EP 2090681 A2, this means that, due to the relatively wide annular gap in the upper area of the vertical axis of symmetry, the strength of the upwardly directed radial force component of the magnetic axial bearing weakens considerably, wherein the axial rigidity of the bearing remains nearly unchanged due to the still narrow annular gap width in the remaining areas.

It is disadvantageous that the upwardly directed radial force component of an axial bearing of this type is frequently too small. Due to tolerances in production, the slightly different annular gap width is also to be manufactured only at very high cost.

The problem addressed by the present invention is that of eliminating the disadvantages known from the prior art and creating an axial bearing as well as a pole disk, which is to be cost-effectively manufactured and permits a non-uniform distribution of the radial forces.

SUMMARY OF THE INVENTION

The problem cited above is solved by an axial bearing and a pole disk having the features described herein.

Additional objects and advantages of the invention will be set forth in part in the following description, or may be obvious from the description, or may be learned through practice of the invention.

The invention provides an axial bearing for a spinning rotor of an open-end spinning machine supported, free of axial thrust, in particular in a bearing interstice of a support disk bearing arrangement. The axial bearing has a static bearing component, which includes at least two axially polarized permanent magnet rings delimited on both sides by ferromagnetic pole disks. The permanent magnet rings are arranged in a bearing housing such that, in the installed state, identical poles, i.e., N/N or S/S, are positioned opposite each other. The bearing housing is made of a non-ferromagnetic material, for example, of plastic or brass. The axial bearing with its static bearing component is provided, in particular, for interacting during operation with a dynamic bearing component, which is formed by ferromagnetic webs arranged on the rotor shaft of the spinning rotor at a distance from the pole disks. Each pole disk has an axis that is arranged vertically in the installed state of the pole disks and an axis arranged orthogonally with respect to the vertical axis, and a central opening and a disk ring. The disk ring surrounds the central opening. The central opening is preferably circular, although this can also be of different sizes in its vertical or horizontal orientation. According to the invention, the disk ring has a chamfer and/or a non-ferromagnetic material in the vertical axis on the inner circumference adjacent to the central opening.

Due to the arrangement of the chamfer and/or the non-ferromagnetic material on the pole disk, the radial force of the axial bearing in the area of the chamfer or of the non-ferromagnetic material is reduced as compared to the other areas. The radial force of the axial bearing can therefore be influenced in a targeted manner by the design of the pole disk and the arrangement of the chamfer or the non-ferromagnetic material on the circumference of the axial bearing. The manufacture of a pole disk of this type is also cost-effective due to the lower tolerances. The chamfer reduces the thickness of the pole disk in the area of the opening. It cuts into the disk ring, for example, by up to 3 millimeters. As a result, the radial force of the axial bearing is reduced at this point. The flatter the chamfer is, i.e., the farther this cuts into the disk ring, the lower is the radial force at this point. The same applies for the non-ferromagnetic material. The radial force is reduced at the point of the non-ferromagnetic material. The farther the non-ferromagnetic material extends, starting from the opening, into the disk ring, the lower is the radial force at this point.

It is advantageous when the chamfer is one-sided, two-sided, crescent-shaped, wedge-shaped, and/or trapezoidal. The chamfer can be arranged on the pole disk on one side or both sides. In the case of a chamfer on one side, the pole disk is flattened in the area of the opening only on one surface of the pole disk. The thickness of the pole disk is therefore reduced on one side. The chamfer can also be provided on both sides, however, such that the thickness of the pole disk is reduced on both surfaces. The pole disk can taper at the thinnest point of the pole disk, although, for example, a web having a thickness of 0.1 millimeters to 0.9 millimeters can also be present.

The shape of the chamfer is preferably crescent-shaped, wedge-shaped, or trapezoidal, depending on how the radial force is to be influenced. In this case as well, the appropriate shape can be arranged on one side or both sides of the pole disk.

It is also advantageous when the height of the central opening in the direction of the vertical axis is unequal to the width of the central opening in the direction of the horizontal axis. Therefore, it is possible that the height in the direction of the vertical axis is lower than the height in the direction of the horizontal axis. This is advantageous primarily for the case in which the pole disk simultaneously forms wear protection function for the rotor shaft. In particular when the pole disk has an area on the disk ring having a non-ferromagnetic material, this can be utilized not only for reducing the radial forces, but also for forming an impact protection, which prevents the rotor shaft from having direct contact with the ferromagnetic material of the pole disks.

It is advantageous when, in the installed state of the pole disks, the chamfer and/or the non-ferromagnetic material are/is formed in the lower half and/or the upper half of the disk ring. In particular when a support disk bearing arrangement having a bearing interstice is utilized for radially supporting the spinning rotor, it can be important that the radial force of the axial bearing present in the vertical direction is reduced in order to prevent the rotor shaft of the spinning rotor from contacting the pole disks due to the radial force of the axial bearing when the spinning rotor is pressed less strongly into the bearing interstice.

It is also advantageous when the non-ferromagnetic material is a slide bearing material, in particular plastic or ceramic. In particular for the case in which it is assumed that the non-ferromagnetic material simultaneously forms an impact protection for the spinning rotor, the slide bearing material ensures that the impact protection has a long service life. The plastic that has been applied, in particular injected, onto the steel plate of the pole disk can therefore also additionally act as a hold-down means, which, above the rotor shaft, is even closer to the rotor shaft than the lower steel part.

It is also advantageous when the non-ferromagnetic material is elastic and/or elastically mounted. Due to the elasticity of the non-ferromagnetic material or its mounting, the shaft of the spinning rotor is also conserved. In this way, in particular when the rotor shaft is slid into and pulled out of the axial bearing, damage to the pole disks or the rotor shaft is prevented, since the non-ferromagnetic material can be appropriately displaced. In addition, differences in thickness are compensated for by the elastic element, for example, a spring element. The elastic element can include, for example, a portion of a soft O-ring.

It is also advantageous when the disk ring is connected in a form-locking and/or force-locked manner. Therefore, the pole disk can be manufactured outside the axial bearing and inserted into the axial bearing during the installation of the axial bearing. Non-ferromagnetic and ferromagnetic materials can also be designed as two pieces. These are then put together, accommodated in the bearing housing, and axially preloaded in the bearing housing.

It is also advantageous when the disk ring is interrupted in the direction of the vertical axis. Such an interruption of the disk ring is also utilized for reducing the radial force of the axial bearing. A metering of the acting radial force can be implemented via the width of the interruption of the disk ring.

A pole disk for an above-described axial bearing according to the invention has an axis that is arranged vertically in the installed state of the pole disk and an axis arranged orthogonally with respect to the vertical axis, and a central opening and a disk ring. The disk ring has a chamfer and/or a non-ferromagnetic material in the vertical axis on the inner circumference adjacent to the central opening. Due to the chamfer and/or the non-ferromagnetic material on the disk ring of the pole disk, the strength of the radial force in the axial bearing is influenced and/or reduced with respect to the rest of the pole disk, in the appropriate area. The radial force can therefore be reduced in a targeted manner on the circumference of the pole disk. This is advantageous, for example, when the force of the radial bearing, which accommodates the rotor shaft supported therein, is of different strengths at least in portions of the application and there is concern, therefore, that the rotor shaft itself or the axial bearing could become damaged.

It is advantageous when the chamfer is one-sided, two-sided, crescent-shaped, wedge-shaped, and/or trapezoidal. The manufacture of the pole disk as well as the mode of operation of the pole disk with respect to the radial force of the axial bearing into which the pole disk is inserted can be influenced as a result.

It is also advantageous when the height of the central opening in the direction of the vertical axis is unequal to the width of the central opening in the direction of the horizontal axis. The strength of the radial force is also influenced by a different height of the central opening in the direction of the two axes. The larger the annular gap is that arises between the pole disk and the rotor shaft, the lesser is the radial force. If, on the other hand, the central opening is reduced by the non-ferromagnetic material, this acts as an impact protection for the rotor shaft.

It is advantageous when, in the installed state of the pole disks, the chamfer and/or the non-ferromagnetic material are/is formed in the lower half and/or the upper half of the disk ring. This is advantageous, in particular with respect to the mounting of the rotor shaft in a bearing interstice of a support disk bearing arrangement, in which it is to be expected that different radial bearing forces can arise in the vertical direction depending on the operating state of the open-end spinning machine.

It is advantageous when the non-ferromagnetic material is a slide bearing material, in particular plastic or ceramic. As a result, the wear of the pole disk as well as the wear of the rotor shaft are reduced.

It is also advantageous when the non-ferromagnetic material is elastic and/or elastically mounted. Since the opening of the pole disk forms the smallest passage cross section for the rotor shaft through the axial bearing, protection for the pole disk and the rotor shaft is formed due to the elastic mounting or the elastic material of the non-ferromagnetic portion of the pole disk.

It is also advantageous when the non-ferromagnetic material is connected with the ferromagnetic material of the disk ring in a form-locking and/or force-locked manner. In this way, the manufacture of the pole disk and the installation of the pole disk in the axial bearing are simplified.

Moreover, it is advantageous when the disk ring has an interruption in the direction of the vertical axis. The radial force in the axial bearing is additionally influenced with such an interruption of the disk ring.

A bearing housing of an axial bearing according to the invention has at least two axially polarized permanent magnet rings delimited on both sides by ferromagnetic pole disks and arranged in a bearing housing such that, in the installed state, identical poles are positioned opposite each other. Each of the pole disks has an axis that is arranged vertically and an axis arranged orthogonally with respect to the vertical axis, and a central opening and a disk ring. The disk ring has a chamfer and/or a non-ferromagnetic material in the vertical axis on the inner circumference adjacent to the central opening. For the rest, the pole disk is advantageously designed according to the preceding description.

The device is designed according to the preceding description, wherein the mentioned features can be present individually or in any combination.

BRIEF DESCRIPTION OF THE DRAWINGS

Further advantages of the invention are described in the following exemplary embodiments, wherein.

DETAILED DESCRIPTION

Figure 1:
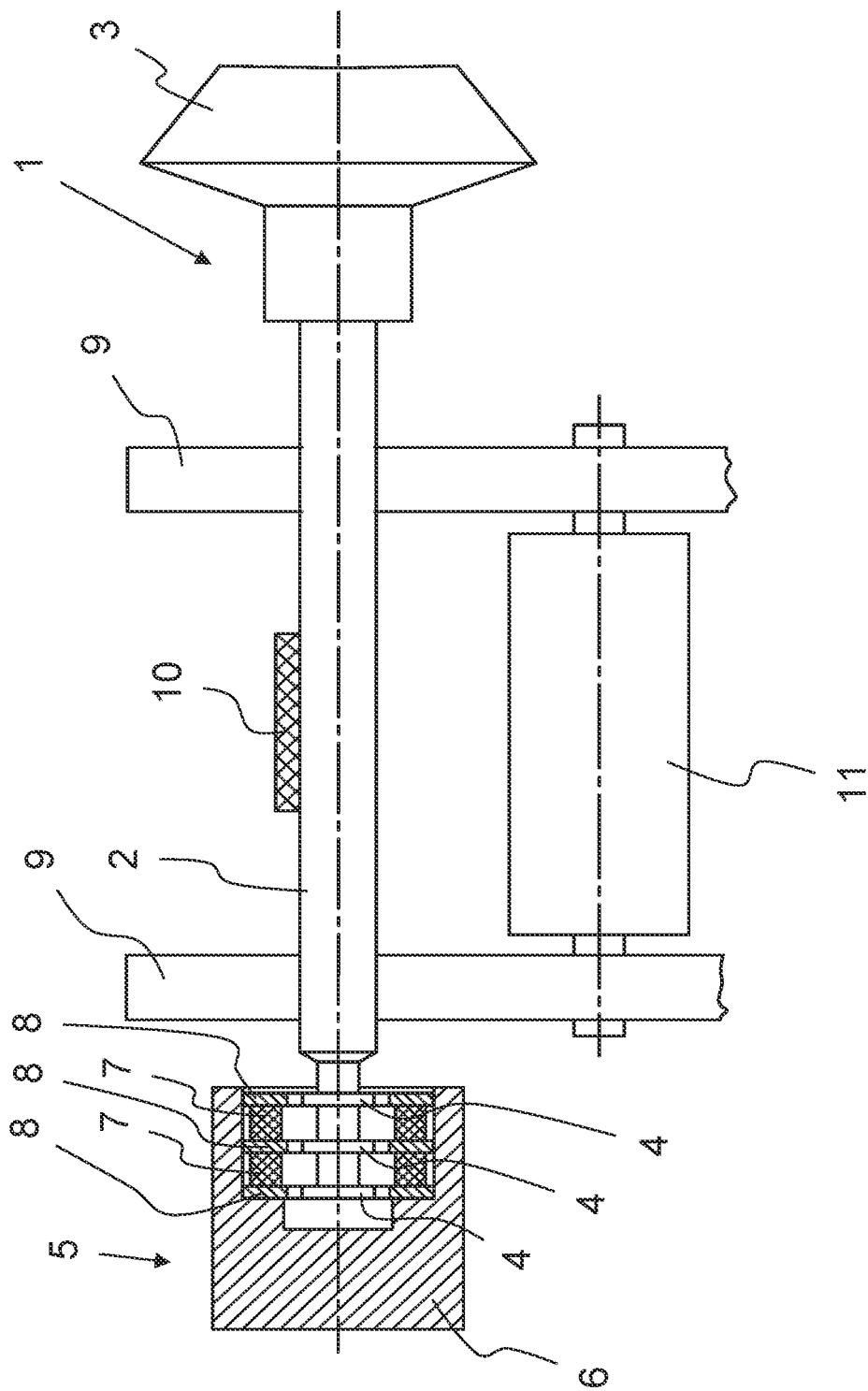
FIG. 1 shows a side view of a bearing of a spinning rotor of an open-end spinning machine.

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

In the following description of the exemplary embodiments, the same reference signs are utilized for features that are identical and/or at least comparable in terms of their configuration and/or mode of operation. Provided the features are not described in detail again, their design and/or mode of operation correspond/corresponds to the design and mode of operation of the above-described features.

FIG. 1 schematically shows a side view of a bearing of a spinning rotor 1 of an open-end spinning machine. The spinning rotor 1 includes a rotor shaft 2, on the one end of which a rotor pot 3 is arranged and, on the other end of which, ferromagnetic webs 4 are arranged. The webs 4 each have a distance from one another and, during operation, form a dynamic bearing component of an axial bearing 5 represented in a longitudinal section. A static bearing component of the axial bearing 5 is formed by a bearing housing 6. Two permanent magnet rings 7, which are positioned opposite each other with their opposite poles, are arranged in the bearing housing 6. The two permanent magnet rings 7 are delimited by ferromagnetic pole disks 8 on both sides. The permanent magnetic rings 7 and the pole disks 8 are fixed in the bearing housing 6. The axial bearing 5 ensures an axial positioning of the rotor shaft 2 due to the forces of the permanent magnetic rings 7.

The webs 4 of the rotor shaft 2 are formed, for example, by recesses in the rotor shaft 2, which can be filled with non-magnetic material. The webs 4 preferably have the same width as the pole disks 8.

The pole disks 8 are made of a ferromagnetic material, preferably of steel. The bearing housing 6 is made of non-ferromagnetic material, for example, of aluminum or of plastic.

In the magnetic axial bearing 5, the magnetic flux extends from the permanent magnet ring 7 across the pole disk 8 to the closest web 4 and across the adjacent web 4 back onto the adjacent pole disk 8 and back again into the permanent magnet ring 7. The magnetic lines of force have the tendency to shorten. The rotor shaft 2 is displaced in the axial direction such that the pole disks 8 are aligned with the webs 4 of the rotor shaft 2 and, thus, the magnetic lines of force are the shortest.

A radial bearing of the rotor shaft 2 is implemented with two pairs of support disks 9, which form a bearing interstice, in which the rotor shaft 2 rotatably rests. Only two support disks 9 of the two pairs are shown in the representation from FIG. 1. Arranged between the support disks 9 is a machine-length drive belt 10, which is pressed onto the rotor shaft 2 with a pressure roller (not represented) and sets the spinning rotor 1 into rotary motion. The support disks 9 are rotatably mounted in a support disk bearing 11. In the radial direction, the rotor shaft 2 is prevented from being displaced out of the bearing center in the middle by the support disks 9 and by the drive belt 10 pressing onto the rotor shaft 2.

The magnetic forces of the axial bearing 5 are that much stronger, the closer the pole disks 8 are located to the webs 4. In the absence of belt pressure, the permanent magnetic rings 7 would pull the rotor shaft 2 perpendicularly upward onto the pole disks 8. The magnetic forces would then be greater than the acting belt pressure. Thus the rotor shaft 2 could no longer be pressed into the bearing center by the drive belt 10. A stop that prevents this is frequently provided in order to ensure that this cannot take place. The radial forces should be relatively low in the direction of the drive belt 10 in order to ensure, as well as possible, that the rotor shaft 2 does not lift away from the support disks 9.

The upwardly acting radial force is reduced, for example, given a greater distance of the web 4 to the pole disk 8 on the top side of the rotor shaft 2, at which the drive belt 10 acts. The axial rigidity of the axial bearing 5 is essentially retained, however.

The present invention is based on the known finding that a greater distance of the pole disk 8 from the web 4 reduces the radial forces. Pole disks 8, as described in the following, are utilized for this purpose. These new types of pole disks 8 reduce the radial forces without the need to necessarily increase the distance of the pole disk 8 from the web 4. The acting radial force is reduced by reducing the thickness of the pole disk 8 at the appropriate point. This takes place by means of a chamfer 12 and/or by means of a non-ferromagnetic material, which replaces the ferromagnetic material of the remaining pole disk 8.

Figure 2:
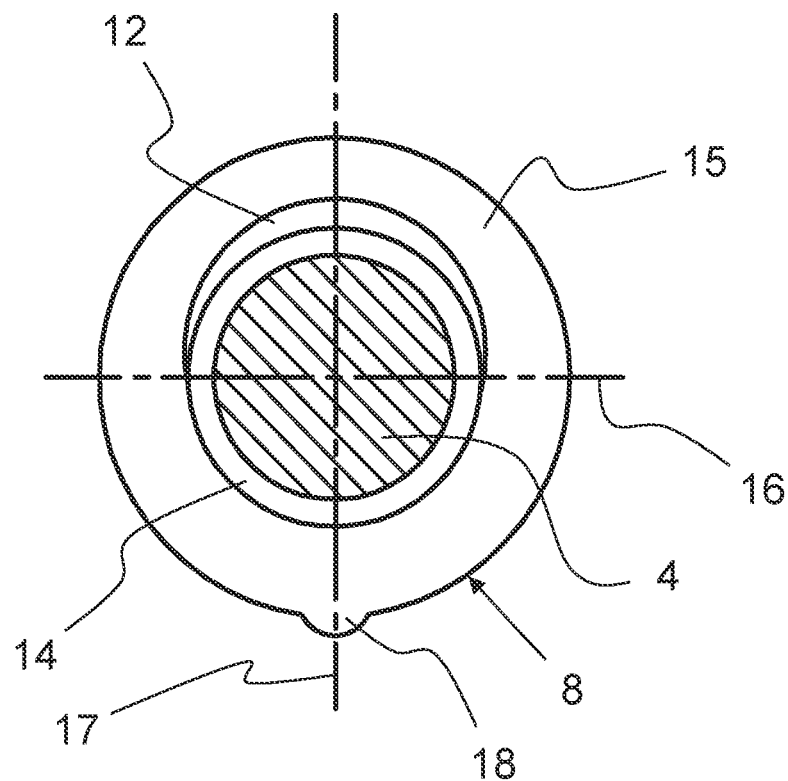
FIG. 2 shows a pole disk according to the invention having a chamfer.

FIG. 2 shows a pole disk 8 according to the invention having a chamfer 12. The web 4 of the rotor shaft 2 is arranged in a central opening 14 such that an annular gap between the web 4 and a disk ring 15 of the pole disk 8 is vacant. The pole disk 8, in the installed state, has a horizontal axis 16 and a vertical axis 17. The chamfer 12 is arranged in the upper area of the disk ring 15 in the direction of the vertical axis 17. The chamfer 12 is designed to be crescent-shaped here, and so the radial force is weakest along the vertical axis 17 and gradually increases toward the horizontal axis 16. In order to be able to carry out the installation of the pole disk 8 in the axial bearing 5 with position accuracy, the pole disk 8 has a projection 18 on its lower end, which, in the bearing housing 6 of the axial bearing 5, can be inserted into a groove.

Due to the chamfer 12 on the upper inner circumference of the disk ring 15, the radial force onto the web 4 and, at this, onto the rotor shaft 2 is reduced, although the central opening 14 and the web 4 are circular and form a uniform annular gap between the central web 4 and the inner circumference of the disk ring 15. Due to the chamfer 12, the risk of the rotor shaft 2 lifting out of the bearing interstice of the support disks 9 is nevertheless reduced.

Figures 3A, 3B, 3C:
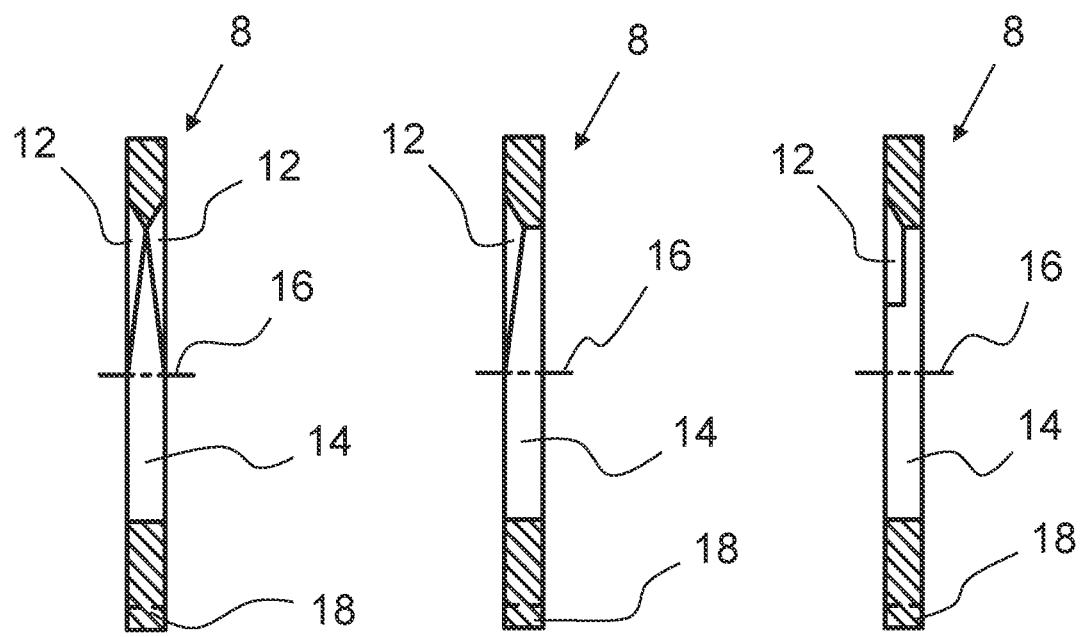
FIGS. 3a-3c show sections through pole disks according to the invention having a chamfer.

FIGS. 3a and 3b show sections through pole disks 8 according to the invention having chamfers 12 of the type which is apparent in the top view in FIG. 2. A double-sided chamfer 12 is represented in FIG. 3a. This means that the thickness of the pole disk 8 is uniformly reduced on both sides such that a tapering triangle arises in cross section. Alternatively, it would also be possible for a trapezoid to be formed from both phases, wherein a certain thickness of the pole disk 8 is still present at the narrowest point. The chamfer 12 and the remaining wall thickness of the pole disk 8 can be varied depending on the desired reduction of the radial force. The chamfer 12 gradually tapers to an end toward the horizontal axis 16.

In FIG. 3b, a similar pole disk 8 is represented in cross section. Here, the chamfer 12 is arranged on only one side. The thickness of the pole disk 8 is therefore reduced to a lesser extent. In this case as well, the chamfer 12 gradually tapers to an end toward the horizontal axis 16. The chamfer 12 could also be designed, for example, to be wedge-shaped, however, and so the weakening of the pole disk 8 in the area of the chamfer 12 is uniform. This is represented in FIG. 3c.

Figure 4:
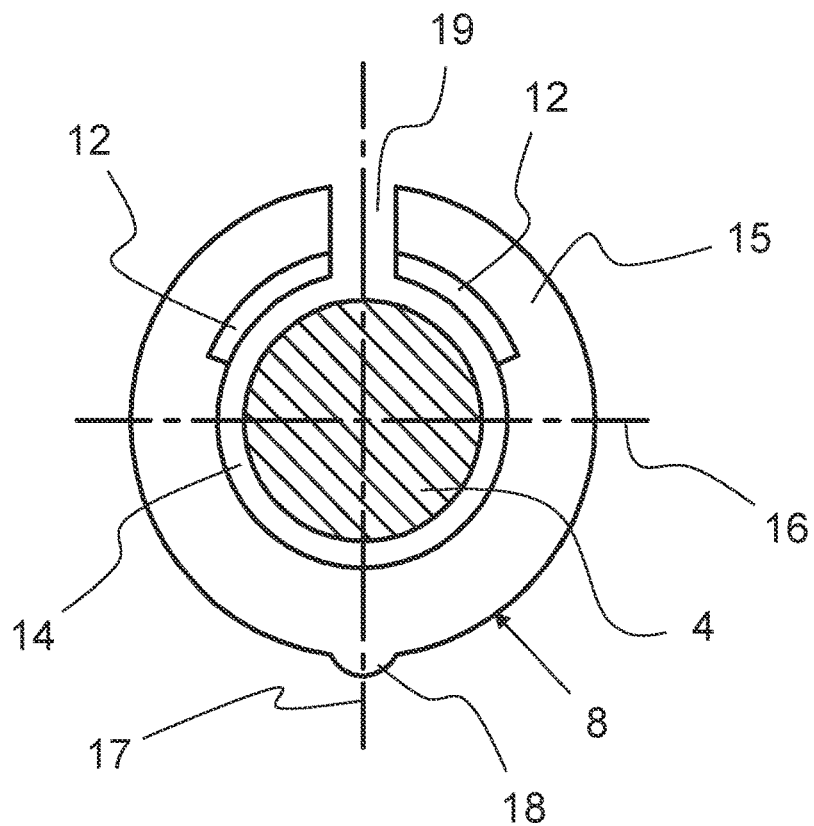
FIG. 4 shows a pole disk according to the invention having a chamfer and an interruption of the disk ring.

FIG. 4 shows a top view of a pole disk 8 having a wedge-shaped chamfer 12 and an interruption 19. The disk ring 15 is therefore not designed to be continuous. The radial forces are greatly reduced in the area of the interruption 19, while they act slightly stronger again in the area of the chamfer 12.

Figure 5:
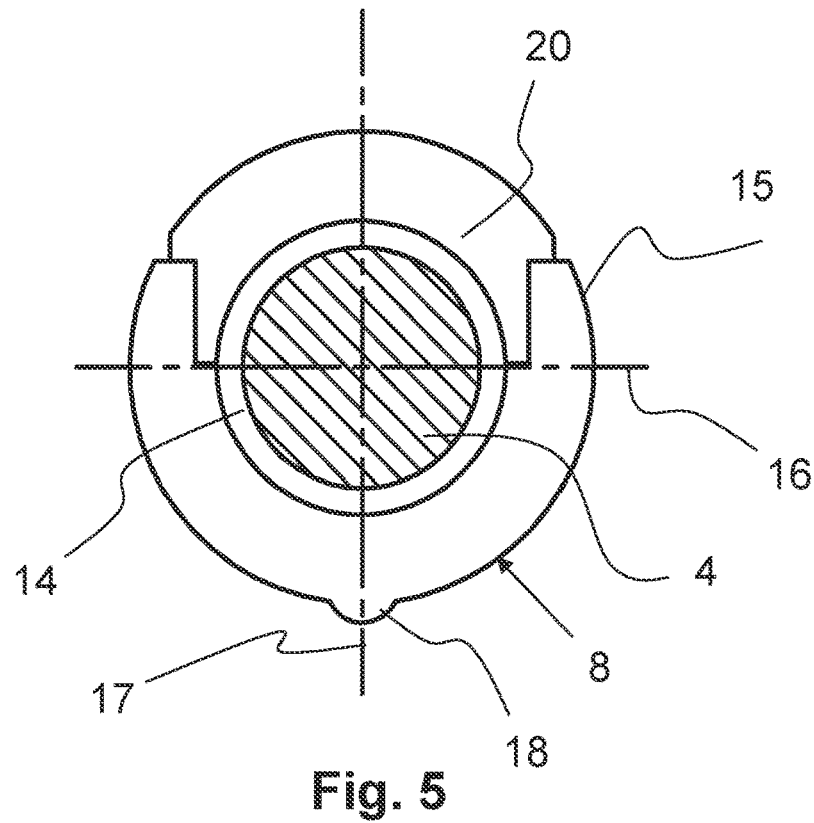
FIG. 5 shows a pole disk according to the invention having an insert made of non-ferromagnetic material.

FIG. 5 shows a pole disk 8 having an insert 20. The insert 20 is made of non-ferromagnetic material, for example, aluminum or plastic. The insert 20 in the present exemplary embodiment is connected to the rest of the pole disk 8 in a force-locked manner. It can be either injected thereon or cast therein or also, for example, bonded. The radial forces of the axial bearing are very greatly or even completely reduced in the area of the insert 20.

Figure 6:
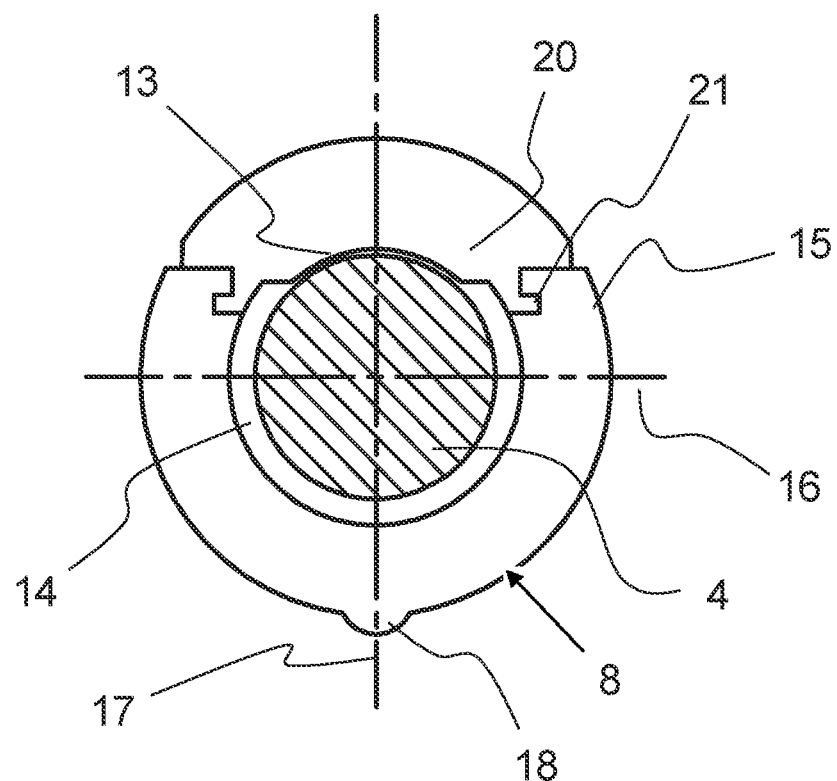
FIG. 6 shows a pole disk according to the invention having another insert made of non-ferromagnetic material.

FIG. 6 shows, similarly to FIG. 5, a pole disk 8 having an insert 20; the insert 20 is connected to the pole disk 8 in a form-locking manner by means of claws 21. The claws 21 can be clipped, for example, to the rest of the pole disk 8. The insert 20 reduces the vacant annular gap between the web 4 and the inner circumference of the pole disk 8. The height of the central opening 14 is therefore lower in the direction of the vertical axis 17 than in the direction of the horizontal axis 16. Due to the insert 20 designed in this way, an impact protection 13 for the web 4 is integrated. If the web 4 or the rotor shaft 2 is moved upward out of the central position, it contacts the insert 20 at the impact protection 13. As a result, it is ensured, at least, that a conductive contact between the web 4 and the pole disk 8 does not arise. If the insert 20 is made of a slide bearing material, it is also ensured that excessive wear is not to be expected also in the event of more frequent contact.

Figure 7:
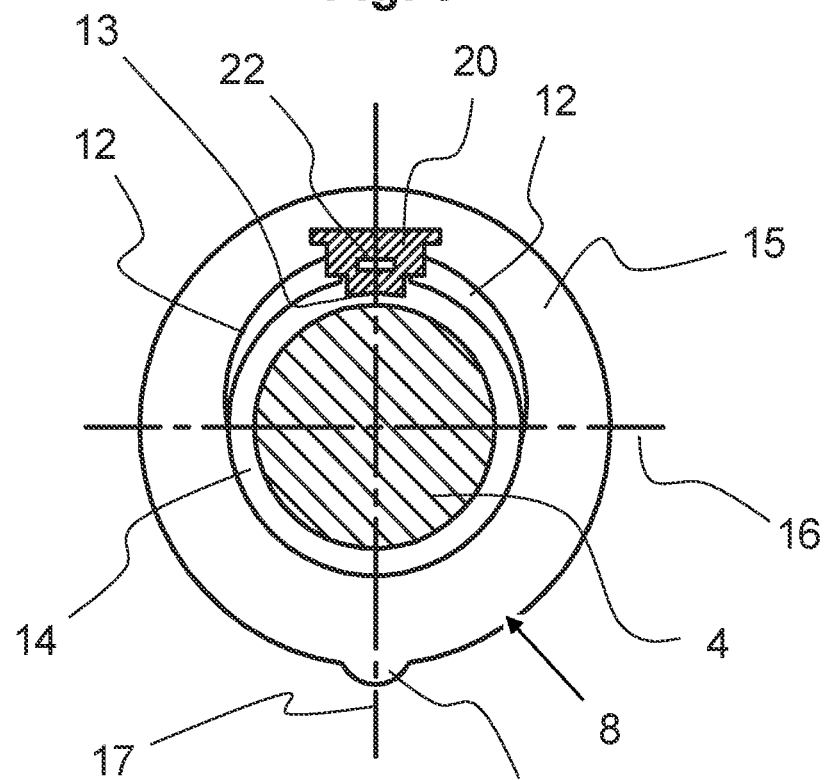
FIG. 7 shows a pole disk according to the invention having a chamfer and an insert made of non-ferromagnetic material.

FIG. 7 shows a top view of a pole disk 8 having a chamfer 12. Another insert 20 is arranged in the area of the vertical axis 17. The insert 20 is mounted on the pole disk 7 in a form-locking manner. The insert 20 has a recess 22, by means of which it is designed to be elastic. When the web 4 contacts the insert 20, the insert 20 yields elastically such that the web 4 or the rotor shaft 2 is decelerated with respect to its deflection and can be returned to the central position.

Figure 8:
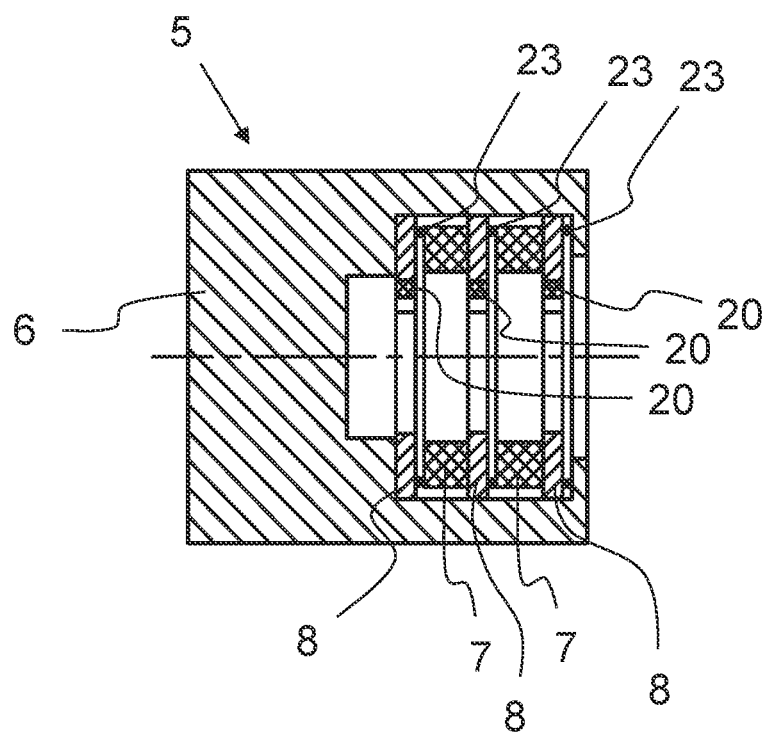
FIG. 8 shows a section through an axial bearing having pole disks with non-ferromagnetic material.

In FIG. 8, a section through an axial bearing 5 having pole disks 8 with non-ferromagnetic material is represented. The non-ferromagnetic material is arranged in a portion of the inner circumference of the pole disk 8 (see FIG. 9). In addition, with respect to the arrangement of the pole disks 8 in the bearing housing 6, it is apparent that an elastic ring 23 is arranged between the pole disks 8 and the permanent magnet rings 7 and between the one outer pole disk 8 and the bearing housing 6. As a result, the pole disk 8 is able to become displaced in the event of an axial impact. This impact can arise when the rotor shaft 2 or the webs 4 is/are inserted into or removed from the bearing housing 6 of the axial bearing 5. As a result, damage to the pole disks 8 is prevented.

Figure 9:
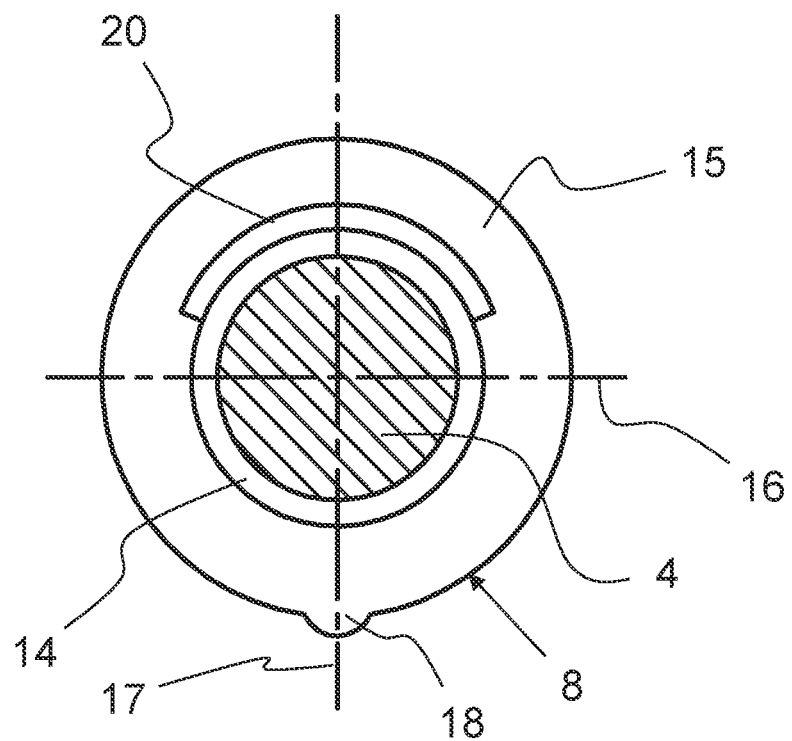
FIG. 9 shows a pole disk according to the invention having a chamfer and an insert made of non-ferromagnetic material.

In FIG. 9, a pole disk 8 is apparent, which has an insert 20 on the inner circumference of the disk ring 15. The insert 20 and the inner circumference of the disk ring 15 transition into one another in a flush manner such that the circular central opening 14 is maintained. As a result thereof as well, a reduction of the radial force in the direction of the vertical axis 17 is enabled.

The present invention is not limited to the represented and described exemplary embodiments. Modifications within the scope of the claims are also possible, as is any combination of the features, even if they are represented and described in different exemplary embodiments.

LIST OF REFERENCE SIGNS 1 spinning rotor
2 rotor shaft
3 rotor pot
4 web
5 axial bearing
6 bearing housing
7 permanent magnetic ring
8 pole disk
9 support disk
10 drive belt
11 support disk bearing
12 chamfer
13 impact protection
14 central opening
15 disk ring
16 horizontal axis
17 vertical axis
18 projection
19 interruption
20 insert
21 claw
22 recess
23 ring

The invention claimed is:

1. An axial bearing for a spinning rotor of an open-end spinning machine, wherein the spinning rotor is supported free of axial thrust in a bearing interstice of a support disk bearing arrangement, the axial bearing comprising:
a static bearing component comprising at least two axially polarized permanent magnet rings delimited on both sides by ferromagnetic pole disks, the magnetic rings and pole disks arranged in a bearing housing such that, in an installed state, identical poles are positioned opposite each other;
the static bearing component configured for interacting during operation with a dynamic bearing component formed by ferromagnetic webs arranged on a rotor shaft of the spinning rotor at a distance from the pole disks;
each pole disk comprising a disk ring and a central opening, each pole disk further comprising a vertical axis and a horizontal axis;
the disk ring comprising an area of reduced ferromagnetic material on an inner circumference thereof at the vertical axis as compared to a remaining inner circumferential area of the disk ring; and wherein the area of reduced ferromagnetic material is defined by one or both of a chamfer formed in the disk ring or a non-ferromagnetic material added onto the disk ring.

2. The axial bearing of claim 1, wherein the chamfer is one-sided, two-sided, crescent-shaped, wedge-shaped, or trapezoidal-shaped.

3. The axial bearing of claim 1, wherein the central opening comprises a height along the vertical axis that is different than a width of the central opening along the horizontal axis.

4. The axial bearing of claim 1, wherein the area of reduced ferromagnetic material is along the vertical axis in a lower half of the disk ring or in an upper half of the disk ring above the vertical axis.

5. The axial bearing of claim 1, wherein the non-ferromagnetic material comprises a slide bearing material.

6. The axial bearing of claim 1, wherein the non-ferromagnetic material is elastic or is elastically mounted onto the disk ring.

7. The axial bearing of claim 1, wherein the non-ferromagnetic material is connected with the ferromagnetic material of the disk ring in a form-locking or force-locked manner.

8. The axial bearing of claim 1, wherein the area of reduced ferromagnetic material comprises an interruption in the disk ring at the vertical axis.

9. A pole disk for an axial bearing for a spinning rotor of an open-end spinning machine, the pole disk comprising:
  a disk ring having a central opening, a vertical axis, and a horizontal axis; and
  an area of reduced ferromagnetic material on an inner circumference thereof at the vertical axis as compared to a remaining inner circumferential area of the disk ring; and
  wherein the area of reduced ferromagnetic material is defined by one or both of a chamfer formed in the disk ring or a non-ferromagnetic material added onto the disk ring.

10. The pole disk of claim 9, wherein the chamfer is one-sided, two-sided, crescent-shaped, wedge-shaped, or trapezoidal-shaped.

11. The pole disk of claim 9, wherein the central opening comprises a height along the vertical axis that is different than a width of the central opening along the horizontal axis.

12. The pole disk of claim 9, wherein the area of reduced ferromagnetic material is along the vertical axis in a lower half of the disk ring or in an upper half of the disk ring above the vertical axis.

13. The pole disk of claim 9, wherein the non-ferromagnetic material comprises a slide bearing material.

14. The pole disk of claim 9, wherein the non-ferromagnetic material is elastic or is elastically mounted onto the disk ring.

15. The pole disk of claim 9, wherein the non-ferromagnetic material is connected with the ferromagnetic material of the disk ring in a form-locking or force-locked manner.

16. The pole disk of claim 9, wherein the area of reduced ferromagnetic material comprises an interruption in the disk ring at the vertical axis.

17. A bearing housing of an axial bearing for a spinning rotor of an open-end spinning machine, comprising:
  at least two axially polarized permanent magnet rings delimited on both sides by ferromagnetic pole disks such that identical poles are positioned opposite each other;
  a static bearing component configured for interacting during operation with a dynamic bearing component formed by ferromagnetic webs arranged on a rotor shaft of the spinning rotor at a distance from the pole disks;
  each pole disk comprising a disk ring and a central opening, each pole disk further comprising a vertical axis and a horizontal axis;
  the disk ring comprising an area of reduced ferromagnetic material on an inner circumference thereof at the vertical axis as compared to a remaining inner circumferential area of the disk ring; and
  wherein the area of reduced ferromagnetic material is defined by one or both of a chamfer formed in the disk ring or a non-ferromagnetic material added onto the disk ring.

* * * * *